March 26, 1968  H. B. MORRIS  3,374,663

VIBRATION DETECTOR

Filed April 16, 1965

Harold B. Morris
INVENTOR.

BY
ATTORNEYS 3,374,663
VIBRATION DETECTOR
Harold B. Morris, Houston, Tex., assignor to Electronic Systems, Inc., Houston, Tex., a corporation of Texas
Filed Apr. 16, 1965, Ser. No. 448,684
11 Claims. (Cl. 73—71.2)

ABSTRACT OF THE DISCLOSURE

A vibration detector having at least one pair of piezoelectric crystals assembled with their edges joined and the central portions spaced apart, mounted in a case and having an inertial mass means associated with the central portion of the crystals. A spacer element between the central portions of the crystals causes the crystals to bow outwardly with respect to each other to a loaded position, thus increasing the sensitivity to vibrations.

---

Figure 1:
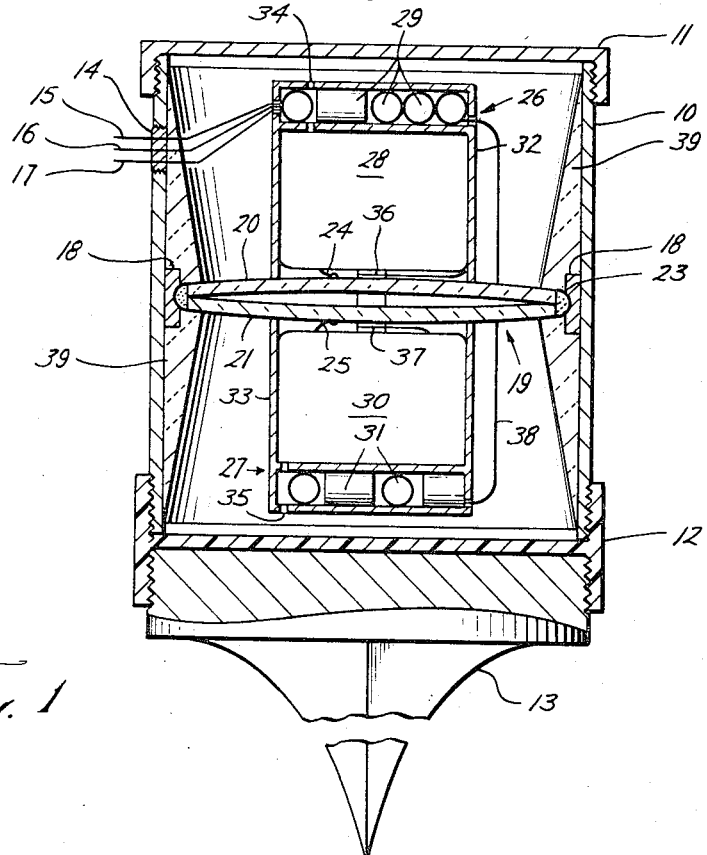

The present invention relates generally to a device for detecting vibrations and more specifically to a crystal-type accelerometer.

Prior to the present invention seismic instruments have long been used and have been suitable in many instances for detecting and recording vibrations in the earth's crust. Such devices have been used to detect earth vibrations which have both natural and man-made causes. Earth quakes are the natural cause of such vibrations and the most common man-made cause is the detonation of an explosive such as used in seismic surveys. Many types of vibration detection devices have been used in seismic work, including devices with crystals, which are responsive to strain, such as flexure or compression, and therefore provide an electric output proportional to the strain imposed. The signal from such crystals is very strong in voltage but must be highly shielded, and the relatively weak current must be amplified to be useful. Much difficulty has been encountered in these crystal-type devices because of the mismatch between the mechanical and electrical input impedance; the latter is inherently high, and the former is so low that resulting loss of sensitivity greatly limits its value in seismic work.

It is therefore an object of the present invention to provide a crystal-type accelerometer with high mechanical advantage, which will detect low-level energy vibrations and which further shields and amplifies the output signal of the crystal to enable undistorted transmission of the signal.

Another object of the present invention is to provide a crystal type of accelerometer which is provided with source filtering and near critical dampening to allow a fast response of the unit to a series of pulse-type vibrations.

Still another object of the present invention is to provide a crystal type of accelerometer which has an integral amplifying circuit contained within an electrostatic shield around the device.

A further object of the present invention is to provide a crystal type of accelerometer which has an integral amplifying circuit and wherein the elements of the circuit are utilized to provide an inertial mass secured to the crystal element of the device increasing the sensitivity of the crystal to vibrations.

Still another object of the present invention is to provide a crystal type of accelerometer in which the crystal elements and the amplifying circuit are contained within the case of the device and the case provides both electrical insulation and an electrostatic shield for the crystals and the circuit.

A still further object of the present invention is to provide a crystal-type vibration detecting device having an integral amplifying circuit contained within a case, together with a semi-solid material which protects the crystal and circuit assembly from damage due to shocks, and further acts as weight, hydraulic restraint, and provides a dampening of the assembly when exposed to vibrations.

Figure 2:
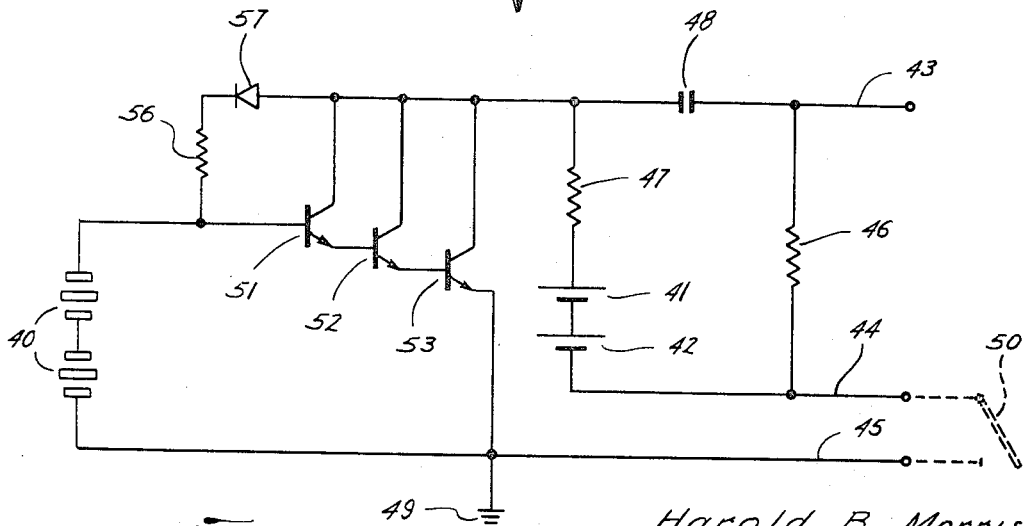

These and other objects of the present invention are completely described and explained in the following specification in relation to the drawing wherein:

FIGURE 1 is a cross-sectional view of the device of the present invention with the elements of the amplifying circuit illustrated schematically; and FIGURE 2 is a simplified wiring diagram of the circuit which is contained within the case of the device of the present invention as illustrated schematically in FIGURE 1.

Referring more in detail to the drawings, the device of the present invention illustrated in FIGURE 1 is provided with the case 10, top closure 11, bottom closure 12 and a spike 13 threadedly engaged by the bottom closure 12. The spike 13 is to be used to provide the engagement of the device in the ground, and any suitable type of engaging device may be used without departing from the present invention. It is to be understood that the device will be mounted in accordance with established knowledge for the particular application for which the device of the present invention is to be used. The side of the case 10 is provided with a suitable plug 14 which will extend through the case 10 to conduct the three leads 15, 16 and 17 from the interior of the case 10 to any suitable recording or indicating device (not shown).

It is generally preferred that the case 10 be made from a material, such as Bakelite lined with copper, which will provide both electrical insulation and an electrostatic shield for the device. Thus, when case 10 is made of such material, it will prevent distortion of the output signal from the device. However, any suitable material may be used for the case 10; for example, a plastic material such as resin-impregnated fiber glass when a separate lining to provide the electrostatic shielding desired is included.

Within the case 10, support elements 18 are bonded to the interior of case 10. Support elements 18 are spaced around the middle interior of the case 10 and are centrally located with respect to the longitudinal axis of the case 10. It is preferred that only three or four of such support elements 18 be used for the reasons hereinafter more fully explained. Such support elements 18 may be made from a relatively hard plastic material, such as vinyl, nylon, Teflon, or other material, which will not readily spring back when deformed. The elements 18 are suitably secured to the interior of the casing 10 with dowel pins (not shown) or by a suitable cement which will retain its bond when the case 10 is exposed to vibrations of the nature which are to be measured by the device of the present invention.

The crystal element 19 is an assembly of parts which, as shown, comprises two crystals 20 and 21 with a small piece of shim stock 22, e.g., beryllium copper, held therebetween at a central position by a bonding agent, preferably a conductor such as silver epoxy, to provide an electric connection between adjacent faces of such crystals 20 and 21. With this small piece of shim stock 22 held by silver epoxy cement between the crystals 20 and 21, the crystals are assembled with their outer peripheries held in contact while the cement 23, which is a nonconducting type of cement, is applied and allowed to set up or cure.

While the bowing of the crystals 20 and 21 is exaggerated in FIGURE 1 for the sake of clarity of the drawing, a slight bending of the crystals will result from this assembly procedure, and such slight bowing has the effect of producing a high mechanical advantage and prestressing the cement 23 which bonds the outer edges of the crystals into the assembly element 19. This bow of the crystals changes during the diaphragm action such that the change in bending is 180° out of phase between the crystals, thus initiating very low level compression and tension, longitudinal-type wave action before the transverse surface waves from the periphery of the crystals becomes effective. The mechanical advantage of the initial longitudinal wave action can be about one hundred times greater than the subsequent surface wave action. The cement 23 used in the bonding of the edges of the crystals 20 and 21 is preferably an epoxy-type cement which hardens into a relatively strong bonding agent to hold the edges of the crystals secure with respect to each other. If desired, two or more of the assembly elements 19, with or without weights, may be used in one case 10 and suitably connected into the circuit, with or without amplifier, to provide the sensitivity for the specific application of the particular device.

The epoxy cement 23 will be in tension vertically. Therefore, the epoxy and discs are under mechanical stress which acts as a bias to increase the sensitivity. i.e., all slack is removed so minute motion can be detected.

The crystals 20 and 21 are the types of crystals which will provide an electric signal when they are subject to a strain. Such crystals are generally classified as piezoelectric crystals. These crystals should be nonhygroscopic. Typical examples of crystals which have been found to be satisfactory for use in the device of the present invention and their Curie points are: barium titanate, Curie point 120° C.; lead titanate-lead zirconate, Curie point 300° C. to 365° C.; and sodium potassium niobate, Curie point 300° C.

A typical example of size of crystal discs of the barium titanate which may be used in the present invention includes two barium titanate crystal discs having an outer diameter one and one-half inches and a thickness of one-twentieth of an inch. Both faces of each crystal disc were silvered and the discs were assembled as illustrated in FIGURE 1 whereby the negative sides of the discs were adjacent in the assembly for series connection or a negative and positive adjacent for parallel connection. A suitable wire is also secured to each of the outer faces of the discs for series connection, or the one wire is secured to the outer faces and one to the inner faces of the discs for parallel connection, to provide the leads 24 and 25 necessary to conduct the output of the discs to the circuit, hereinafter more fully described, when they are subjected to strain. It is preferred that the leads from the crystal discs be multiple wire leads for greater flexibility and that the bare ends of the wires which are joined to the discs be secured to the silvered faces in a groove near the periphery of the discs.

The crystal element 19 is a capacitor-type generator which produces a rising response with rising frequency. The crystals have a capacitive reactance which decreases with frequency. Any inductive reactance increases with frequency, therefore, the two will cancel to the extent of the smaller.

Two circuit assemblies 26 and 27 are preassembled and are secured by bonding with a suitable nonconducting epoxy cement to the opposite sides of the crystal element 19, as shown in FIGURE 1. The circuit assembly 26 which is mounted above crystal element 19 includes the battery 28, some circuit components 29 and the necessary wiring to connect the components 29 and the battery 28 into the desired circuit. The circuit assembly 27 which is mounted below crystal element 19 includes the battery 30, the remaining portion of the circuit components 31 and the necessary wiring to connect the components 31 and the battery 30 into the desired circuit. Each of the circuit assemblies 26 and 27 includes means 32 and 33, respectively, for securing the respective circuit components, battery and wiring into an assembly. When the components are completely assembled into the assemblies 26 and 27, a suitable masking tape may be used as means 32 and 33 to bond the assemblies to the respective sides of the crystal element 19. The battery which may be used in both circuit assemblies 26 and 27 is a mercury cell battery having an output potential of 1.35 volts. The breathing ports 34 and 35, respectively, are provided in the means 32 and 33 since such batteries will generate a slight amount of gas when current is flowing. With each of the assemblies 26 and 27 completely assembled and secured with the means 32 and 33, they are secured to opposite sides of the crystal element 19 as by cementing of the means 32 and 33 to the element 19. The central poles on both of the batteries is provided with a wire lead, and such lead is connected into the other circuitry. Also, an insulating material, such as an epoxy cement, is provided at 36 and 37 to electrically insulate the central poles of the batteries 28 and 30 from the respective sides of the crystal element 19. With the whole unit assembled, suitable wiring 38 extending from the circuiry of one assembly to the other is provided. The wiring 38 extends from assembly 26 to assembly 27 around the outside of the crystal element 19. The completed unit is positioned in the case 10 with the outer edges of the crystal element 19 positioned and partially supported by the support elements 18 which are secured to the interior wall of case 10.

When the assemblies 26 and 27 and the crystal element 19 have been positioned within the case 10 as shown and described, then a silicone compound 39, such as number 11 Dow Corning silicone compound, will be added to the case 10 and should at least fill the portion of case 10 as shown in FIGURE 1. The silicone compound 39 is in engagement with the entire outer periphery of the crystal element 19 and extends to the interior of case 10. While a specific compound has been mentioned for grease 39, any suitable compound may be used which will provide the desired dampening, protective, hydraulic restraint and weight action. In all cases a small portion of the case 10 at both the top and bottom should not be filled with silicone grease 39. The spaces between the crystal element 19 and the circuit assemblies 26 and 27 are not filled with silicone grease. The use of the silicone grease 39 will protect the unit against shocks of dropping or severe vibrations, will act as a hydraulic restraint and will also provide a weight for the weight action against the crystal elements 19.

When a high degree of sensitivity is not necessary, such as when measuring acceleration in a range from ten to twenty times gravity, then no weights should be used in the assembly and the circuits and batteries should not be allowed to impose their weights on the crystal element 19. For high sensitivity and ability to withstand rough treatment, the unweighted transducer elements are assembled in multiple arrays as desired. For seismic work, nine such assemblies have provided excellent ruggedness and sensitivity.

The natural frequency of crystal element 19 in the mounting described is about 2000 cycles per second which is much higher than the frequencies encountered in most geophysical exploration. The usual seismic spectrum of frequencies in a bore hole below weathering generally peak in the range from 60 to 100 cycles per second which are attenuated in passing through the weathered zone so low frequencies predominate to make frequencies from 25 to 30 cycles per second the most predominant signal frequencies previously recorded. The increased response of the device of the present invention to frequencies higher than 30 cycles per second is beneficial in adding sharpness, character and more resolution due to the critical dampening of the crystal at the usual seismic frequencies. Also, separation of events is important in geophysical interpretation. The crystal element 19 is nonresonate in that the natural frequency is extremely high compared to frequencies being measured.

The crystal connection is such that the currents produced by diaphragm action tend to add, and currents produced by lateral motion tend to cancel. In diaphragm action one disc will be in lateral tension and the other in lateral compression. This produces current flow, e.g., plus-to-minus in one and minus-to-plus in the other.

Prior devices have had a resonant frequency close to the frequencies being measured. The present device may be used to measure frequencies from less than 1 c.p.s. to at least 1500 cycles per second, and most measurements have indicated a resonant frequency of approximately 2000 cycles per second or higher. Operation of the device on frequencies far from its resonant frequency provides a near critical dampening and therefore provides a correct indication of the frequencies imposed on the device uncluttered by any resonant vibrations set up in the unit.

Silicone grease 39 bonds the periphery of the crystal element 19 to the case 10. Relative motion between the periphery of the element 19 and the case 10 is almost nil since such a change in crystal position would require that the silicone grease flow through the restricted space against the force tending to cause such relative motion. The relative great distance between the case 10 and the central portion of the element 19 not only keeps the silicone grease from exerting any appreciable restraint of relative movement between the central portion of the element 19 and the case 10, but permits the compound to act as added weight. The weight of the circuit assemblies 25 and 26 and the weight of the silicone grease 39 insure relative vertical motion between the center of the crystals and the case 10 resulting from vertical acceleration of the entire unit.

Additional weights may be used to lower the frequency threshold. The circuit assemblies may be wrapped with lead to increase the weight, to allow lower frequencies to be detected and to provide greater sensitivity. Alternatively, multiple transducer assemblies 19 can be used instead of more weights to accomplish such higher sensitivity.

Referring to the schematic circuit illustrated in FIGURE 2, the crystal element 19 of FIGURE 1 is illustrated schematically as the crystals 40. The batteries 28 and 30 are illustrated in FIGURE 2 as batteries 41 and 42. The leads 15, 16 and 17 which extend from case 10 in FIGURE 1 are the leads 43, 44 and 45 in FIGURE 2. The resistor 46 is connected across the leads 43 and 44 with the resistor 47 and the capacitor 48 and in parallel connection to the resistor 46. Lead 45 and one side of the crystals 40 are connected to ground 49. A switch 50, shown in dashed lines in FIGURE 2 because it would not be contained within case 10, is connected exteriorly of the case 10 across the leads 44 and 45 whereby when such switch 50 is closed, lead 44 and the circuit connected thereto will be connected to the ground 49.

The three transistors 51, 52 and 53 are connected in a cascade with the emitters being connected to the base connection of the next of the transistors and with the last emitter connection being connected to the ground 49. The collector connections of each of the transistors 51, 52 and 53 are connected into the battery circuit at a point between resistor 47 and capacitor 48. The other lead from the crystals 40 is connected into the base connection of transistor 51.

A circuit, including the resistor 56 and the silicon diode 57, extends from the collector lead of transistor 51 to the base lead of transistor 51.

The transistors 51, 52 and 53 are NPN transistors which are sold by Motorola and identified by the number 2N2222. Typical ratings of the components which are used in the circuit illustrated in FIGURE 2 would be: resistor 46, 2,200 ohms; resistor 47, 560 ohms; capacitor 48, 660 microfarads; and resistor 56, 100 megohms.

The currents produced by the crystal element 40 are superimposed on the bias current which becomes multiplied by the current gains of three transistors 51, 52 and 53, establishing a final direct current flow through resistor 47 of several milliamps. The current gain increment is improving with increasing current so that the first transistor provides most of the 5 to 10 megohms input impedance. The voltage gain is about 10 to 20 making the total power gain a million or more.

If desired, a pair of germanium diodes may be positioned in reverse parallel circuit across the leads extending from the crystals 40. Such diodes are slow to respond and are turned on by the alternating current signal from the crystal element in proportion to the voltage and the on pulse time. Such diodes are frequency sensitive and will provide an added circuit response which increases with frequency. These diodes act as an automatic gain control and aid in preventing overloading of the amplifier.

The basic circuit illustrated will respond to frequencies in the range from 1 to 1500 cycles per second. Such a device would be acceptable for detecting earthquakes and for some seismic work. Also, the circuit may be further modified by including a capacitor having a rating of 25 micromicrofarads in the connection between the crystals 40 and the connection of resistor 56 into the base of transistor 51. A double pole, double throw switch would also be inserted in the circuit whereby one portion of the switch will provide a bypass for the above-mentioned capacitor and the other portion of the switch will control inclusion of the pair of germanium diodes in the circuit across the leads from crystals 40. Therefore, this switch would enable the switching from the general wideband geophone illustrated to a special detector band. This band would have a frequency range of from 600 to 1500 cyclts per second. This type of device may readily be used for detecting the initial arrival of closely spaced pulses from dynamite explosions (head wave pulse detection). A further modification on the circuit may be made by adding another capacitor in parallel with the first additional one and thereby change the frequency range to an intermediate frequency.

From the foregoing it can be seen that the present invention provides a crystal-type accelerometer which is extremely rugged by virtue of the silicone grease used between the case and the crystal element, which includes the amplifying circuitry as an inertial mass secured to the crystal as a unitary assembly, all contained within a case, which provides an electrostatic shield and electric insulation and further an amplified low impedance output signal which will not be distorted by ground effects. The type of crystal used is mounted to have a natural frequency substantially above the frequency of vibrations which are to be measured and therefore provides critical dampening of the crystal allowing ready separation of vibrations received to increase response and sharpness. Another advantageous feature is the hydraulic mounting of the dual crystal element wherein the edges are secured while the crystals are at least slightly bowed whereby the sensitivity response of the crystal is greatly improved.

What is claimed is:

1. A vibration detector, comprising
 a crystal assembly having a pair of crystals,
 means for bonding the edges of crystals together in said crystal assembly,
 means for spacing the central portion of the crystals apart whereby when the edges are bonded by said bonding means, said crystals are bowed outwardly with respect to each other to a loaded position,
 a case,
 means supporting said crystal assembly in said case, and
 inertial mass means associated with the central portion of said crystal assembly whereby the center of said crystals remains substantially motionless when said case is subjected to vibration to subject said crystals to a stress responsive to the vibrations of the case.

2. A vibration detector according to claim 1 wherein, said spacing means provides an electrical connection between the central portions of the inner surfaces of said crystals, and said bonding means is a non-conducting cement.

3. As a subcombination in a vibration detector, a crystal assembly comprising
a pair of piezoelectric crystals,
means bonding the outer edges of said crystals together, and
means spacing the central portion of said crystals apart whereby said crystals are slightly bowed outwardly from each other in a loaded condition.

4. As a subcombination in a vibration detector, a crystal assembly comprising,
a pair of piezoelectric crystals,
means bonding the outer edges of said crystals together providing contact between the outer peripheries of inner surfaces of said crystal, and
means spacing the central portion of said crystals apart whereby said crystals are slightly bowed outwardly from each other in a loaded condition.

5. As a subcombination in a vibration detector, a crystal assembly according to claim 4 wherein,
said spacing means provides an electrical connection between the central portions of the inner surfaces of said crystals.

6. As a subcombination in a vibration detector, a crystal assembly according to claim 4 including,
means for providing electrical connection to the inner and outer surfaces of said crystals.

7. As a subcombination in a vibration detector, a crystal assembly according to claim 4 wherein,
said bonding means is a non-conducting cement.

8. An accelerometer according to claim 1 including,
a portion of said case being filled with a semi-solid material, said material surrounding the outer portion of said crystals and extending therefrom to cover a substantially fixed relationship to each other.

9. A vibration detector according to claim 1, wherein, said means bonding the edges of each of said pairs of crystals is an epoxy which will bond to the edges of said crystals to hold the crystal edges in substantially fixed relationship to each other.

10. A vibration detector according to claim 1 including, an amplifier circuit connected to amplify the output of said crystals and positioned within said case.

11. A vibration detector according to claim 10 wherein, the components of said amplifier circuit are secured to said crystals to provide said inertial mass means for increasing the response and sensitivity of said crystals to vibrations.

References Cited

UNITED STATES PATENTS

| | | | |
|---|---|---|---|
| 1,980,993 | 11/1934 | Hayes | 340—17 |
| 2,313,129 | 3/1943 | Dohan | 310—8.6 |
| 2,714,672 | 8/1955 | Wright et al. | 73—517 X |
| 3,002,179 | 9/1961 | Kuester | 340—10 X |
| 3,030,606 | 4/1962 | Harris | 310—8.7 X |
| 3,241,373 | 3/1966 | Ricketts et al. | 73—517 X |
| 3,274,539 | 9/1966 | Sykes | 340—10 |
| 3,283,590 | 11/1966 | Shang | 73—73 |

OTHER REFERENCES

Carlson, E. V.: Ceramic Vibration Pickup, May 1953, Radio-Electronic Engineering, pages 8, 9 and 27.

RICHARD C. QUEISSER, *Primary Examiner.*

J. P. BEAUCHAMP, JR., *Assistant Examiner.*